United States Patent
Kawasaki et al.

(10) Patent No.: US 12,476,081 B2
(45) Date of Patent: Nov. 18, 2025

(54) METHODS AND APPARATUS FOR PROCESSING A SUBSTRATE

(71) Applicant: APPLIED MATERIALS, INC., Santa Clara, CA (US)

(72) Inventors: Katsumasa Kawasaki, Los Gatos, CA (US); Kartik Ramaswamy, San Jose, CA (US); Yue Guo, Redwood City, CA (US); Chunlei Zhang, Santa Clara, CA (US); Sergio Fukuda Shoji, San Jose, CA (US); Jorge Zaninovich, Santa Clara, CA (US); Smbat Kartashyan, Santa, CA (US)

(73) Assignee: Applied Materials Inc., Santa Clara, CA (US)

( * ) Notice: Subject to any disclaimer, the term of this patent is extended or adjusted under 35 U.S.C. 154(b) by 748 days.

(21) Appl. No.: 17/078,728

(22) Filed: Oct. 23, 2020

(65) Prior Publication Data
US 2022/0130642 A1    Apr. 28, 2022

(51) Int. Cl.
*H01J 37/32* (2006.01)
*G01R 25/02* (2006.01)
*H01J 37/244* (2006.01)

(52) U.S. Cl.
CPC ........ *H01J 37/32183* (2013.01); *G01R 25/02* (2013.01); *H01J 37/244* (2013.01); *H01J 2237/24564* (2013.01); *H01J 2237/2485* (2013.01); *H01J 2237/334* (2013.01)

(58) Field of Classification Search
USPC .................................................. 156/345.28
See application file for complete search history.

(56) References Cited

U.S. PATENT DOCUMENTS

| | | | |
|---|---|---|---|
| 5,971,591 A * | 10/1999 | Vona | H01J 37/3299 219/121.54 |
| 6,046,594 A | 4/2000 | Mavretic | |
| 6,535,785 B2 | 3/2003 | Johnson et al. | |
| 6,887,339 B1 * | 5/2005 | Goodman | H01J 37/32082 156/345.47 |
| 7,666,464 B2 | 2/2010 | Collins et al. | |
| 8,334,657 B2 | 12/2012 | Xia | |
| 9,578,731 B2 * | 2/2017 | Van Zyl | H01J 37/32935 |
| 10,354,840 B2 * | 7/2019 | Bock | H05H 1/46 |

(Continued)

FOREIGN PATENT DOCUMENTS

CN   107430976   * 12/2017  ........ H01J 37/32183

*Primary Examiner* — Ram N Kackar
(74) *Attorney, Agent, or Firm* — Moser Taboada

(57) ABSTRACT

Methods and apparatus for processing a substrate are provided herein. For example, apparatus can include a first voltage/current (V/I) probe configured to connect to an input side of a matching network of the processing chamber and a second V/I probe configured to connect to an output side of the matching network and a processor coupled to the first V/I probe and the second V/I probe and configured to, based on a phase gap between a V and I of an RF signal detected by at least one of the first V/I probe or the second V/I probe at a target frequency, detect a minimum phase gap between the V and I, and control at least one of impedance tuning of the matching network or process control of the processing chamber using at least one of a peak or RMS of V, I and phase measured at the target frequency or under sweeping frequency.

6 Claims, 11 Drawing Sheets

(56) References Cited

U.S. PATENT DOCUMENTS

| | | | |
|---|---|---|---|
| 10,483,090 B2 * | 11/2019 | Bhutta | H03H 11/28 |
| 2006/0220574 A1 * | 10/2006 | Ogawa | H01J 37/32183 |
| | | | 315/111.21 |
| 2010/0194195 A1 * | 8/2010 | Coumou | H01J 37/32174 |
| | | | 307/24 |
| 2016/0079037 A1 * | 3/2016 | Hirano | H01J 37/32183 |
| | | | 156/345.28 |

* cited by examiner

| | Reference Signal with Known Phase Angle | | | | | | | | | Minium Phase Gap Magnitude (absolute value) | Correction Factor (Phase angle + Minium phase gap) |
|---|---|---|---|---|---|---|---|---|---|---|---|
| | 1002 180° | 1004 135° | 1006 90° | 1008 45° | 1010 0° | 1012 -45° | 1014 -90° | 1016 -135° | 1018 -180° | | |
| | 100 | 55 | 10 | -35 | -80 | -125 | -170 | -215 | -260 | \|10\| = 10 | -90+10 = -80 |
| 1020 Signal Actual Phase Angle | | | | | | | | | | | |
| -80° | | | | | | | | | | | |

Figure 11

METHODS AND APPARATUS FOR PROCESSING A SUBSTRATE

FIELD

Embodiments of the present disclosure generally relate to a methods and apparatus for processing a substrate.

BACKGROUND

Chamber matching circuits that include radio frequency (RF) sensors to measure voltage/current (and phase) on substrate processing tool transmission lines are known. RF sensors are, typically, composed of analog circuits or half analog circuits and half digital circuits that are configured to calculate an impedance (or power) using measured voltage/current to maintain chamber matching, which is an important factor during substrate processing (e.g., plasma etch processing). Calculating an accurate impedance (or power), however, using measured voltage and current on RF transmission lines is sometimes difficult, e.g., as a phase difference between the voltage and current approaches +/−90 degrees. Additionally, as the phase between the voltage and current approaches +/−90 degrees, the effects of noise or modeling error can increase the likelihood of obtaining inaccurate or false impedance (or power) measurements.

SUMMARY

Methods and apparatus for processing a substrate are provided herein. In some embodiments, an apparatus configured to couple to a processing chamber for processing a substrate includes a first voltage/current (V/I) probe configured to connect to an input side of a matching network of the processing chamber and a second V/I probe configured to connect to an output side of the matching network and a processor coupled to the first V/I probe and the second V/I probe and configured to, based on a phase gap between a V and I of an RF signal detected by at least one of the first V/I probe or the second V/I probe at a target frequency, detect a minimum phase gap between the V and I, and control at least one of impedance tuning of the matching network or process control of the processing chamber using at least one of a peak or RMS of V, I and phase measured at the target frequency or under sweeping frequency.

In accordance with at least some embodiments, a method for processing a substrate in a processing chamber can include, based on a phase gap between a voltage (V) and current (I) of an RF signal detected by at least one of a first V/I probe or a second V/I probe at a target frequency, detecting a minimum phase gap between the V and I and controlling at least one of impedance tuning of a matching network of the processing chamber or process control of the processing chamber using at least one of a peak or RMS of V, I and phase measured or calculated at the target frequency or under sweeping frequency.

In accordance with at least some embodiments, a non-transitory computer readable storage medium having stored thereon instructions that when executed by a processor perform a method for processing a substrate in a processing chamber. The method can include, based on a phase gap between a voltage (V) and current (I) of an RF signal detected by at least one of a first V/I probe or a second V/I probe at a target frequency, detecting a minimum phase gap between the V and I and controlling at least one of impedance tuning of a matching network of the processing chamber or process control of the processing chamber using at least one of a peak or RMS of V, I and phase measured or calculated at the target frequency or under sweeping frequency.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIG. 11 is a table showing the phase gap between the sensed RF signal and each of the plurality of generated reference signals shown in FIG. 10.

Figure 1:
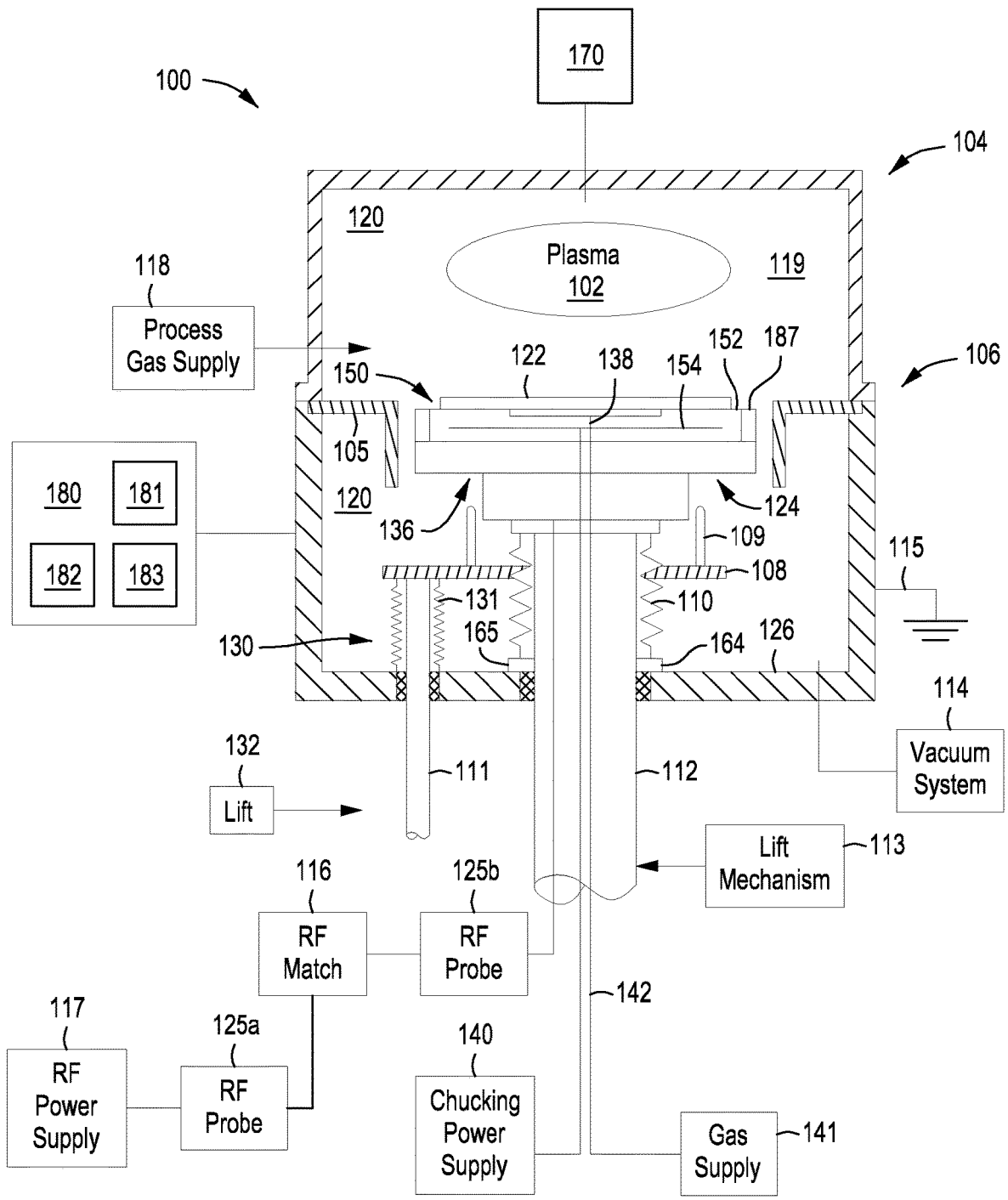
FIG. 1 is a schematic side view of a processing chamber including a matching network in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of methods and apparatus using radio frequency (RF) probes for phase correction of measured voltage and current are described herein. For example, the apparatus can include one or more probes (sensors) that are coupled to a processor including one or more digital components, e.g., a digital signal processor, a phase comparator, a reference signal generator, and the like. The one or more probes are configured to measure voltage and current and transmit the measured voltage and current to the processor. The processor is configured to generate one or more predetermined phase and reference signals that can be used to detect a minimum phase gap to calculate actual phase (e.g., recovered phase information) from a measured phase gap (e.g., reduced from actual detected phase down from about 90 degrees) to obtain a more accurate measurement of voltage and current. The one or more probes can be connected to an input and/or output of a matching network. When connected to the input of the matching network, the one or more probes can measure an accurate impedance at the matching network for faster impedance tuning, and when provided at the output of the matching network, the one or more probes can provide chamber analysis and/or process control of the processing chamber.

FIG. 1 depicts a schematic side view of a processing chamber 100 (e.g., a plasma processing chamber) including a matching network in accordance with at least some embodiments of the present disclosure. In some embodiments, the processing chamber 100 is an etch processing chamber. However, other types of processing chambers configured for different processes can also be used or be modified for use with embodiments of the methods and apparatus described herein.

The processing chamber 100 is a vacuum chamber which is suitably adapted to maintain sub-atmospheric pressures within a chamber interior volume 120 during substrate processing. The processing chamber 100 includes a chamber body 106 covered by a lid 104 which encloses a processing volume 119 located in the upper half of chamber interior volume 120. The processing chamber 100 may also include one or more shields 105 circumscribing various chamber components to prevent unwanted reaction between such components and ionized process material. The chamber body 106 and lid 104 may be made of metal, such as aluminum. The chamber body 106 may be grounded via a coupling to ground 115.

A substrate support 124 is disposed within the chamber interior volume 120 to support and retain a substrate 122, such as a semiconductor wafer, for example, or other such substrate as may be electrostatically retained. The substrate support 124 may generally comprise an electrostatic chuck 150 and a hollow support shaft 112 for supporting the electrostatic chuck 150. The electrostatic chuck 150 comprises a ceramic plate 152 having one or more electrodes 154 disposed therein and a cooling plate 136. The hollow support shaft 112 provides a conduit to provide, for example, backside gases, process gases, fluids, coolants, power, or the like, to the electrostatic chuck 150. The substrate support 124 includes a ceramic ring 187 disposed about the ceramic plate 152.

In some embodiments, the hollow support shaft 112 is coupled to a lift mechanism 113, such as an actuator or motor, which provides vertical movement of the electrostatic chuck 150 between an upper, processing position (as shown in FIG. 1) and a lower, transfer position (not shown). A bellows assembly 110 is disposed about the hollow support shaft 112 and is coupled between the electrostatic chuck 150 and a bottom surface 126 of the processing chamber 100 to provide a flexible seal that allows vertical motion of the electrostatic chuck 150 while preventing loss of vacuum from within the processing chamber 100. The bellows assembly 110 also includes a lower bellows flange 164 in contact with an O-ring 165 or other suitable sealing element which contacts the bottom surface 126 to help prevent loss of chamber vacuum.

The hollow support shaft 112 provides a conduit for coupling a backside gas supply 141, a chucking power supply 140, and RF generator (e.g., RF plasma power supply 170 and a bias power supply 117) to the electrostatic chuck 150. In some embodiments, RF energy supplied by the RF plasma power supply 170 may have a frequency of about 40 MHz or greater. The backside gas supply 141 is disposed outside of the chamber body 106 and supplies heat transfer gas to the electrostatic chuck 150. In some embodiments, a RF plasma power supply 170 and the bias power supply 117 are coupled to the electrostatic chuck 150 via respective RF match networks (only the matching network 116 shown). In some embodiments, the substrate support 124 may alternatively include AC, DC, or RF bias power.

One or more voltage (V)/current (I) probes can be connected to the matching network 116 and a matching network connected the RF plasma power supply 170. For illustrative purposes, one or more V/I probes 125a, 125b are shown connected to the matching network 116. For example, the one or more V/I probes 125a, 125b can be operably connected to an input side and an output side (e.g., an input V/I probe and an output V/I probe) of the matching network 116. In at least some embodiments, the V/I probe 125a (e.g., a first V/I probe) can connect to the input side of the matching network 116 via an RF coaxial cable that connects the bias power supply 117 to the matching network 116. Likewise, the V/I probe 125b (e.g., a second V/I probe) can be connected to an output of the matching network 116 via an RF coaxial cable that connects to the processing chamber 100 through an RF transmission line, as described in more detail below. In at least some embodiments, the V/I probes 125a, 125b can be configured such that the RF coaxial cable extends through the V/I probe 125. In such an embodiment, the V/I probes 125a, 125b can have an open center portion that is configured to receive the RF coaxial cable therethrough. Alternatively, the V/I probes 125a, 125b can be configured to connect to an area adjacent the input and output of the matching network 116 that is suitable for allowing the V/I probes 125a, 125b to take measurements of the V and I during operation of the processing chamber 100. In at least some embodiments, the V/I probe 125a can be configured for automatic impedance tuning and the V/I probe 125b can be configured for chamber analysis and/or process control.

In some embodiments, the bias power supply 117 is electrically coupled to the cooling plate 136 to create a same bias voltage on the substrate 122 and an edge ring (not shown). In operation, the bias power supply 117 applied on the cooling plate 136 creates a sheath in between the substrate 122 and the plasma 102. As a result, ions from the plasma 102 are attracted to the substrate 122 that is biased, and the ions accelerate through the sheath perpendicular to equipotential lines within the sheath.

For a minimum impact on the substrate 122 and direct voltage control, the bias power supply 117 is advantageously configured to provide a negative pulsed DC power source to the one or more chucking electrodes (not shown). The negative pulsed DC power source is configured to provide a power profile to correct sheath bending and maintain a substantially flat sheath profile across the substrate 122.

A substrate lift 130 can include lift pins 109 mounted on a platform 108 connected to a shaft 111 which is coupled to a second lift mechanism 132 for raising and lowering the substrate lift 130 so that the substrate 122 may be placed on or removed from the electrostatic chuck 150. The electrostatic chuck 150 may include thru-holes to receive the lift pins 109. A bellows assembly 131 is coupled between the substrate lift 130 and bottom surface 126 to provide a flexible seal which maintains the chamber vacuum during vertical motion of the substrate lift 130.

In some embodiments, the electrostatic chuck 150 includes gas distribution channels 138 extending from a lower surface of the electrostatic chuck 150 (e.g., bottom surface of the cooling plate 136) to various openings in an upper surface of the electrostatic chuck 150. The gas distribution channels 138 are configured to provide backside gas, such as nitrogen (N) or helium (He), to the top surface of the electrostatic chuck 150 to act as a heat transfer medium. The gas distribution channels 138 are in fluid communication with the backside gas supply 141 via gas conduit 142 to control the temperature and/or temperature profile of the electrostatic chuck 150 during use.

The processing chamber 100 is coupled to and in fluid communication with a vacuum system 114 which includes a throttle valve (not shown) and vacuum pump (not shown) which are used to exhaust the processing chamber 100. The pressure inside the processing chamber 100 may be regulated by adjusting the throttle valve and/or vacuum pump. The processing chamber 100 is also coupled to and in fluid communication with a process gas supply 118 which may supply one or more process gases to the processing chamber 100 for processing a substrate disposed therein.

The processing chamber 100 includes a system controller 180 to control the operation of the processing chamber 100 during processing. The system controller 180 comprises a central processing unit (CPU) 181, a memory 182 (e.g., non-transitory computer readable storage medium), and support circuits 183 for the CPU 181 and facilitates control of the components of the processing chamber 100. The system controller 180 may be one of any form of general-purpose computer processor that can be used in an industrial setting for controlling various chambers and sub-processors. The memory 182 stores software (source or object code) that may be executed or invoked to control the operation of the processing chamber 100 in the manner described herein.

In operation, for example, a plasma 102 may be created in the chamber interior volume 120 to perform one or more processes. The plasma 102 may be created by coupling power from a plasma power source (e.g., RF plasma power supply 170) to a process gas via one or more electrodes near or within the chamber interior volume 120 to ignite the process gas and creating the plasma 102. A bias power may also be provided from a bias power supply (e.g., bias power supply 117) to the one or more electrodes 154 within the electrostatic chuck 150 to attract ions from the plasma towards the substrate 122.

Figure 2:
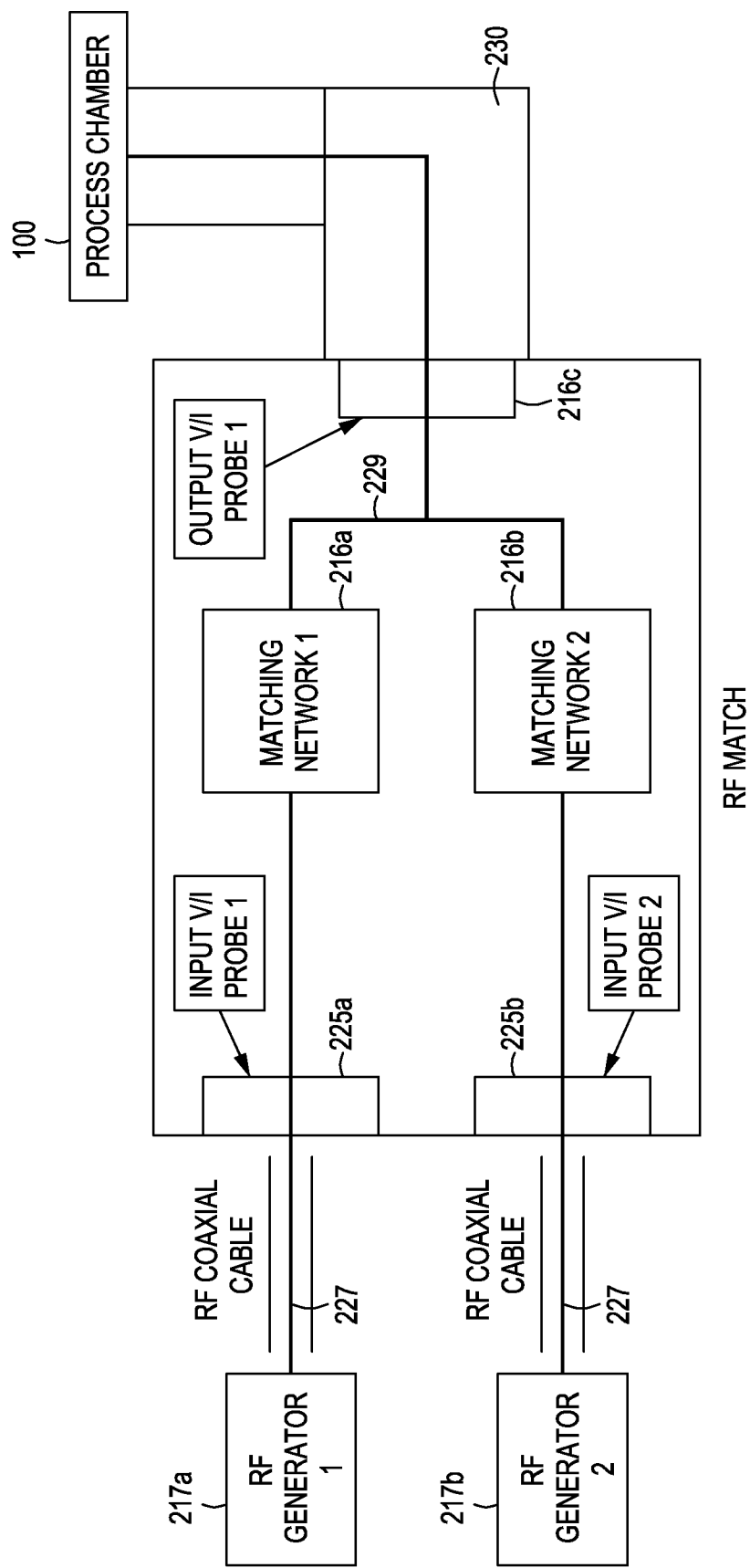
FIG. 2 is a block diagram of a processing chamber including matching networks in accordance with at least some embodiments of the present disclosure.

FIG. 2 is a block diagram of the processing chamber 100 of FIG. 1 including matching networks in accordance with at least some embodiments of the present disclosure. For example, in embodiments when two or more bias power supplies are used (two bias power supplies 217a, 217b are shown), two or more matching networks 216a, 216b are provided. Additionally, each matching network 216a, 216b has connected to an input thereof a corresponding V/I probe 225a, 225b (e.g., first V/I probes). As described above, the probes 225a, 225b can be connected to RF coaxial cables 227. Similarly, connected to an output of the matching networks 216a, 216b can be one more V/I probes (e.g., second V/I probes). For example, each of the matching networks 216a, 216b can have a corresponding V/I probe connected to an output thereof via an RF coaxial cable 229, which extends through an RF transmission line 230. Alternatively, a single or common V/I probe 225c (e.g., a second V/I probe) can be shared by each of the matching networks 216a, 216b, as shown in FIG. 2.

Figure 3:
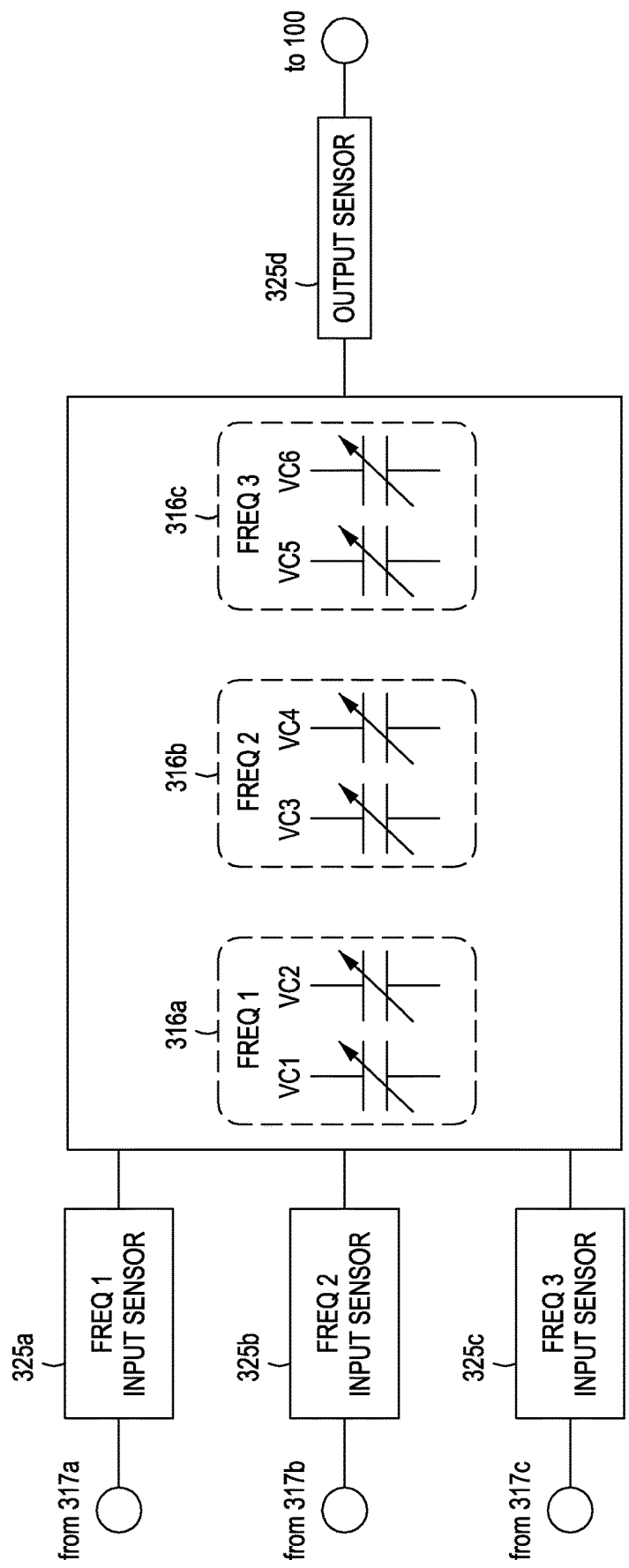
FIG. 3 is schematic diagram of a components of matching networks in accordance with at least some embodiments of the present disclosure.

FIG. 3 is schematic diagram of a components of matching networks in accordance with at least some embodiments of the present disclosure. For illustrative purposes, the three matching networks 316a-316c. As noted above, each of the matching networks 316a-316c can have a corresponding V/I probe 325a-325c (e.g., first V/I probes) connected to an input thereof for receiving an RF signal from a corresponding bias power supply 317a-317c. Additionally, a V/I probe 325d (e.g., a second V/I probe) can be shared of the matching networks 316a-316c in a manner as described above.

Continuing with reference to FIG. 3, each of the V/I probes 325a-325c can be configured to detect a V or I at a particular frequency, e.g., a triple frequency match. The matching networks 316a-316c can include one or more variable capacitors that can used by the matching networks 316a-316c for automatic impedance tuning to a target frequency of a corresponding bias power supply, as described in greater detail below. In at least some embodiments, each of the matching networks 316a-316c can include two variable capacitors of the six variable capacitors VC1-VC6.

Figure 4:
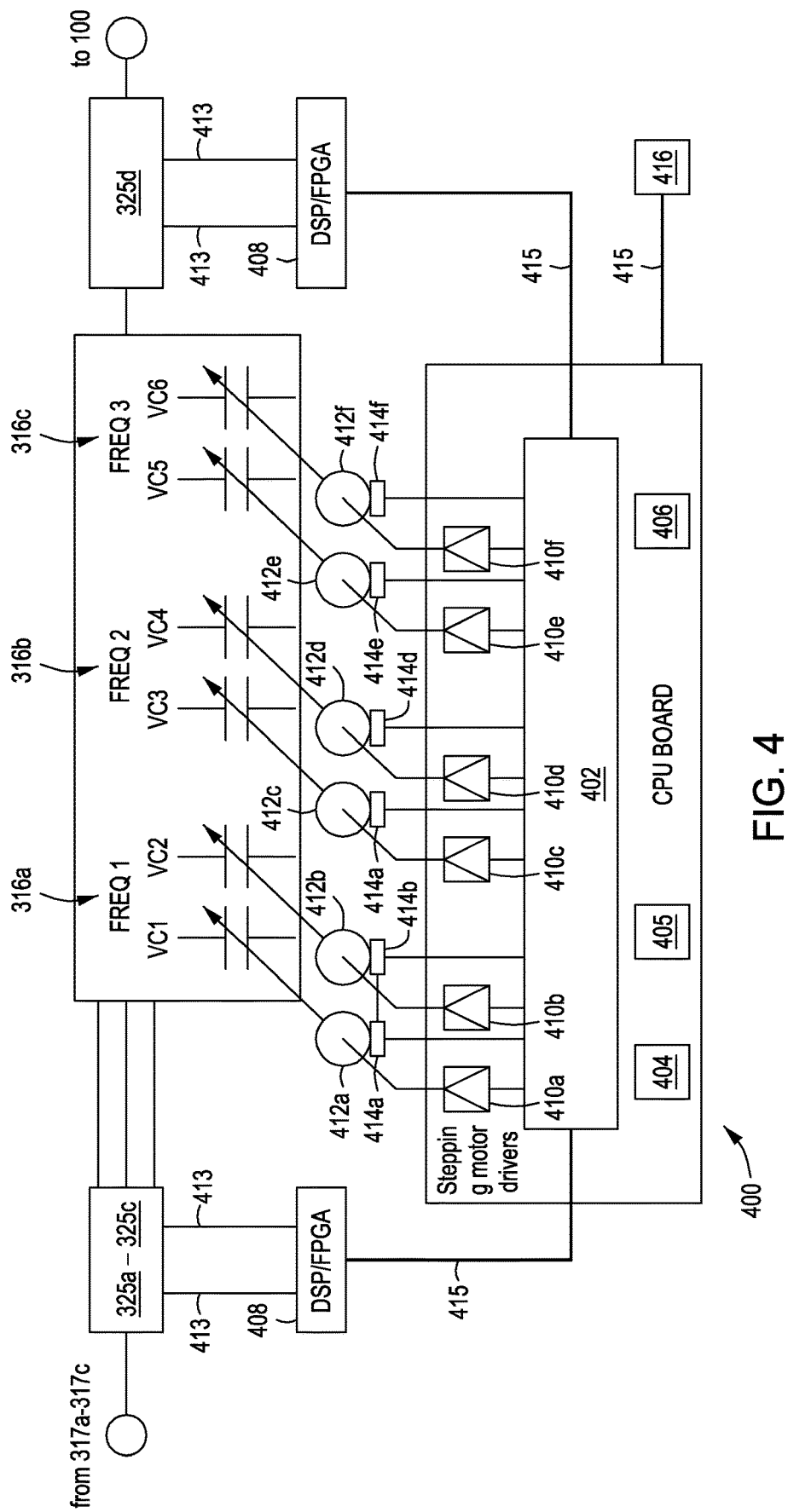
FIG. 4 is a schematic diagram of an RF match tuning configuration in accordance with at least some embodiments of the present disclosure.

FIG. 4 is a schematic diagram of an RF match tuning configuration in accordance with at least some embodiments of the present disclosure. For example, a controller 400 (e.g., the system controller 180) is configured to control the matching networks 316a-316c and the V/I probes 325a-325d and comprises a CPU 402 (or processor), a signal generator 405, a memory 404 (e.g., non-transitory computer readable storage medium having stored therein instructions, firmware, software, etc.), and support circuits 406 for the CPU 402. The controller 400 is connected, via one or more bus 415 or other electrical connections, to circuitry 408, such as one or more digital signal processors (DSPs), field-programmable gate array (FPGAs), or the like, that are configured for filtering the RF signal(s) at a target frequency. For example, in at least some embodiments, the circuitry 408 can include one or more analog to digital (A/D) converters, phase comparators, and/or digital filtering algorithms including, but not limited to, a finite impulse response (FIR) filter, an infinite impulse response (IIR) filter, or the like. Each of the circuitry 408 can connect, via one or more RF coaxial cables 413 or other electrical connections, to a corresponding one of the V/I probes 325a-325c, or the V/I probes 325a-325c can share a circuitry 408, as shown in FIG. 4. For clarity, in FIG. 4 the V/I probes 325a-325c are shown as a single module receiving RF signals from corresponding bias power supplies 317a-317c and connecting to the matching networks 316a-316c (see FIG. 3, for example).

Continuing with reference to FIG. 4, the controller 400 can include one or more stepping motor drivers that connect to corresponding motors, and/or encoders that together are configured to adjust the variable capacitors VC1-VC6 during operation. For example, in at least some embodiments, the controller 400 can include stepping motor drives 410a-410f, motors 412a-412f, and encoders 414a-414f. Additionally, the controller can connect to one or more interfaces 416, such as serial lines, ECATs, interlock analog signals to the processing chamber 100, fans, cover switches, and the like (not shown).

Figure 5:
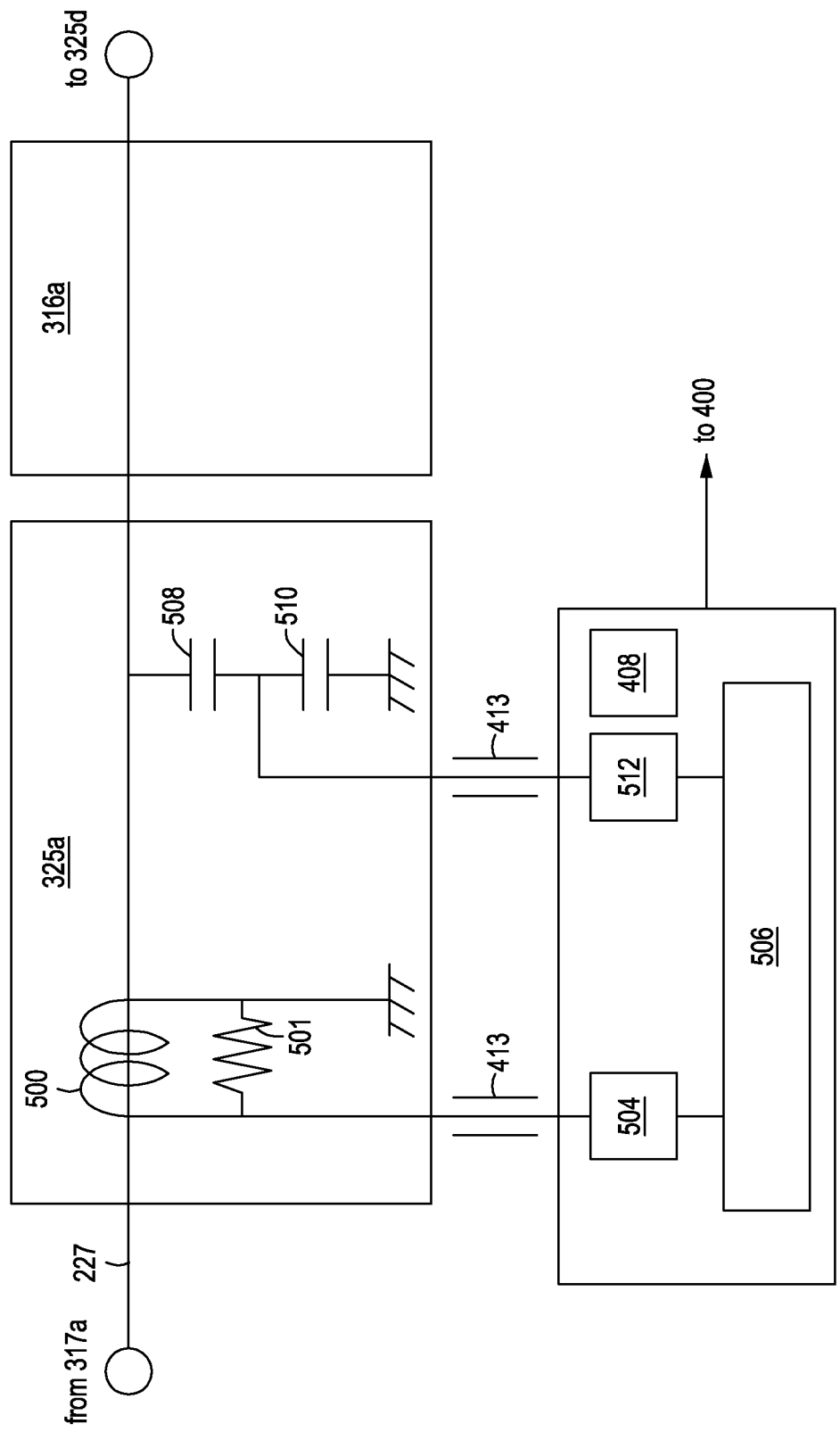
FIG. 5 is a schematic diagram of an RF match input probe configuration in accordance with at least some embodiments of the present disclosure.

FIG. 5 is a schematic diagram of a V/I probe (e.g., RF matching network input probe) configuration in accordance with at least some embodiments of the present disclosure. Other than a connection location, the V/I probes described herein are identical to each other. Accordingly, for illustrative purposes, FIG. 5 is described in terms of the V/I probe 325a.

The V/I probe 325a includes one or more types of inductors having any suitable inductance. In at least some embodiments, the V/I probe 325a includes an inductor 500 that is positioned around the RF coaxial cable 227 (or through which the RF coaxial cable 227 extends). The inductor 500 has a first end that connects, via to the RF coaxial cable 413 (e.g., to measure a current or forward portion of an RF signal), to an A/D converter 504 that is connected to a DSP or a FPGA 506 on the circuitry 408, and a second end that connects to ground. Connected in parallel to the inductor 500 can be one or more types of resistors 501 having any suitable resistance. The inductor 500 is configured to detect current and the resistor 501 is configured to transform the detected current value to a corresponding voltage value.

The V/I probe 325a also includes one or more types of capacitors having any suitable capacitance. In at least some embodiments, the V/I probe 325a includes two capacitors 508, 510 that are connected in series with each other. The capacitors 508 has a first end that connects to the RF coaxial cable 227 (e.g., to measure a voltage or reflected portion of an RF signal) and a second end that connects to an A/D converter 512 that is connected to the DSP or a FPGA 506 on the circuitry 408. The second end of the capacitor 508 also connects to the capacitor 510 which is connected to ground. An effective circuit V handling capability of the circuitry 408 can be increased when the capacitors 508, 510 are connected in series. The capacitors 508, 510 are arranged in a voltage divider network to reduce a voltage for measurement.

Values of the inductor 500, resistor 501, and the capacitors 508, 510 can be varied based on a particular frequency provided by the RF power supply.

In at least some embodiments, such as when the RF frequency is VHF, the V/I probe 325a can be connected to or configured as a directional coupler, e.g., because power of the VHF signal would be too strong for the V/I probe 325a to measure directly.

Figure 6:
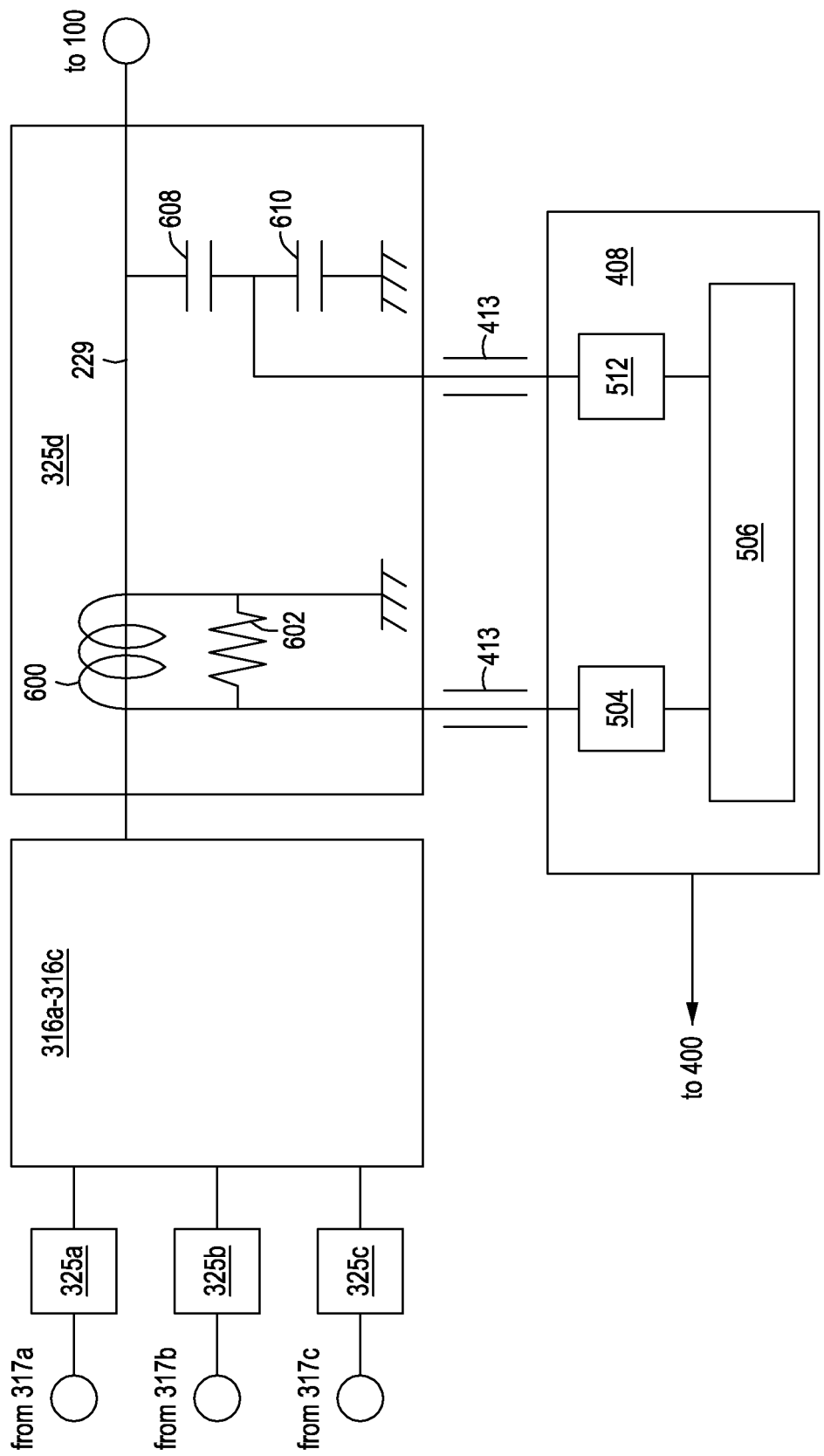
FIG. 6 is a schematic diagram of an RF match output probe configuration in accordance with at least some embodiments of the present disclosure.

FIG. 6 is a schematic diagram of a V/I probe (e.g., RF matching network output probe) configuration in accordance with at least some embodiments of the present disclosure. FIG. 6 is described in terms of the V/I probe 325d. As noted above, other than a connection location, the V/I probes described herein are identical to each other. Accordingly, only those aspects that are unique to the V/I probe 325d and the circuitry 408 are described herein.

The V/I probe 325d includes one or more types of inductors having any suitable inductance. In at least some embodiments, the V/I probe 325d includes an inductor 600 that is positioned around the RF coaxial cable 229 (or through which the RF coaxial cable 229 extends). The inductor 600 has a first end that connects, via to the RF coaxial cable 413 (e.g., to measure a current or forward portion of an RF signal), to an A/D converter 504 that is connected to a DSP or a FPGA 506 on the circuitry 408, and a second end that connects to ground. Connected in parallel to the inductor 600 can be one or more types of resistors 602 having any suitable resistance.

The V/I probe 325d also includes one or more types of capacitors having any suitable capacitance. In at least some embodiments, the V/I probe 325d includes two capacitors 608, 610 that are connected in series with each other. The capacitors 608 has a first end that connects to the RF coaxial cable 229 (e.g., to measure a voltage or reflected portion of an RF signal) and a second end that connects to an A/D converter 512 that is connected to the DSP or a FPGA 506 on the circuitry 408. The second end of the capacitor 608 also connects to the capacitor 610 which is connected to ground. As noted above, effective circuit V handling capability of the circuitry 408 can be increased when the capacitors 608, 610 are connected in series.

Values of the inductor 600, resistor 601, and the capacitors 608, 610 can be varied based on a particular frequency provided by the RF power supply.

In at least some embodiments, such as when the RF frequency is VHF, the V/I probe 325d can be connected to or configured as a directional coupler, e.g., because power of the VHF signal would be too strong for the V/I probe 325d to measure directly.

Figure 7:
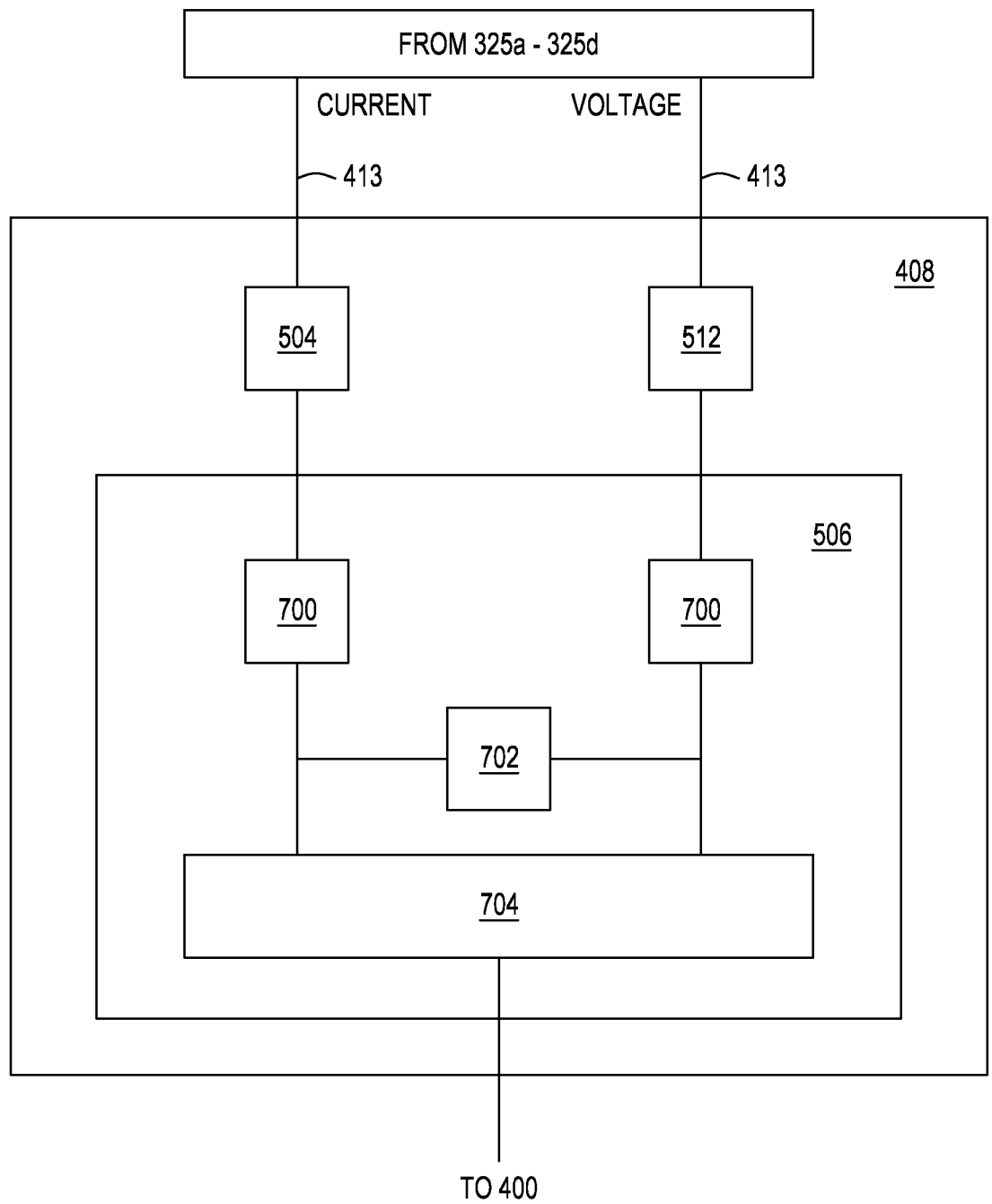
FIG. 7 is a block diagram of a digital filtering configuration in accordance with at least some embodiments of the present disclosure.

FIG. 7 is a block diagram of a digital filtering configuration (e.g., the DSP or FPGA 506) in accordance with at least some embodiments of the present disclosure. As noted above, the DSP or FPGA 506 are configured to filter RF signals at a target frequency. Accordingly, the DSP or FPGA 506 can include one or more filters 700 including but not limited to an FIR filter, an IIR filter, or other filter suitable for filtering signals at the target frequency. In at least some embodiments, the one or more filters can be an FIR filter and/or an IIR filter. The one or more filters 700 receive respective inputs from the A/D converter 504 and the A/D converter 512. The one or more filters 700 filter out noise, harmonics, intermodulation, or other undesirable signals/interference at the target frequency and transmit a filtered signal at the target frequency to a phase comparator 702, which is configured to generate a voltage signal that represents a phase difference between the current inputs and voltage inputs received from the V/I probes 325a-325d. The phase comparator 702 is configured to determine a minimum phase gap between the V and I using the phase difference, as will be described in greater detail below. The one or more filters 700 and the phase comparator 702 transmit an input to an interface module 704 that is configured to trigger an alert.

In at least some embodiments, the controller 400, the circuitry 408, and/or the one or more of the V/I probes 325a-325d can be components of a matching network. Alternatively, the controller 400, the circuitry 408, and the one or more V/I probes 325a-325d can be connected to the matching network, as described above. In at least some embodiments, the controller 400, the circuitry 408, and the one or more V/I probes 325a-325d can be configured as a stand-alone system that is configured to couple to a processing chamber (e.g., to an input and output of one or more matching networks), in a manner as described above. Additionally, in at least some embodiments, the controller 400 and the circuitry 408 can be omitted and the system controller 180 can be configured to operate in place thereof.

Figure 8:
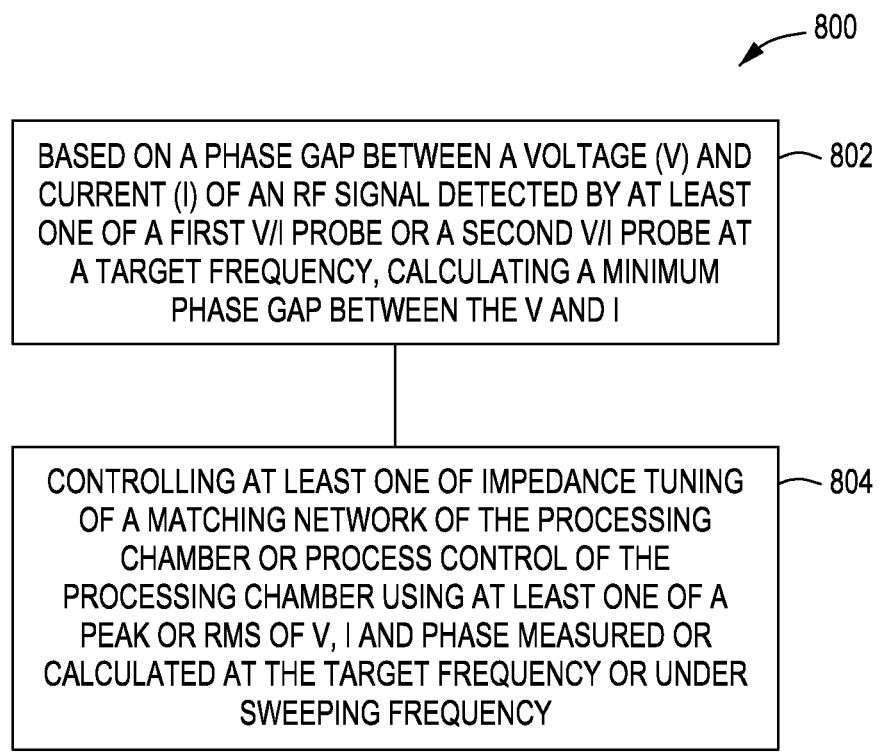
FIG. 8 is a flowchart of a method for processing a substrate in accordance with at least some embodiments of the present disclosure.

FIG. 8 is a flowchart of a method 800 for processing a substrate in accordance with at least some embodiments of the present disclosure.

At 802, based on a phase gap between a V and current I of an RF signal detected by at least one of a first V/I probe or a second V/I probe at a target frequency, a phase between the V and I is detected. For example, during operation, under control of a controller (e.g., the controller 400) a first V/I probe (e.g., the V/I probe 325a) connected to an input side of a matching network (e.g., the matching network 316a) of a processing chamber (e.g., the processing chamber 100) provides sensed V and I information (e.g. a magnitude and a corresponding phase of the V and I). The sensed V and I information can be used by the matching network for impedance tuning and/or load impedance measurement. As noted above, in some instances a phase difference between the V and I may be relatively close to +/−90°, which can make it difficult to obtain accurate phase measurements, and, therefore, accurate power measurement, which, in turn, can result in inaccurate impedance tuning and/or impedance measurements at the matching network.

Figure 9:
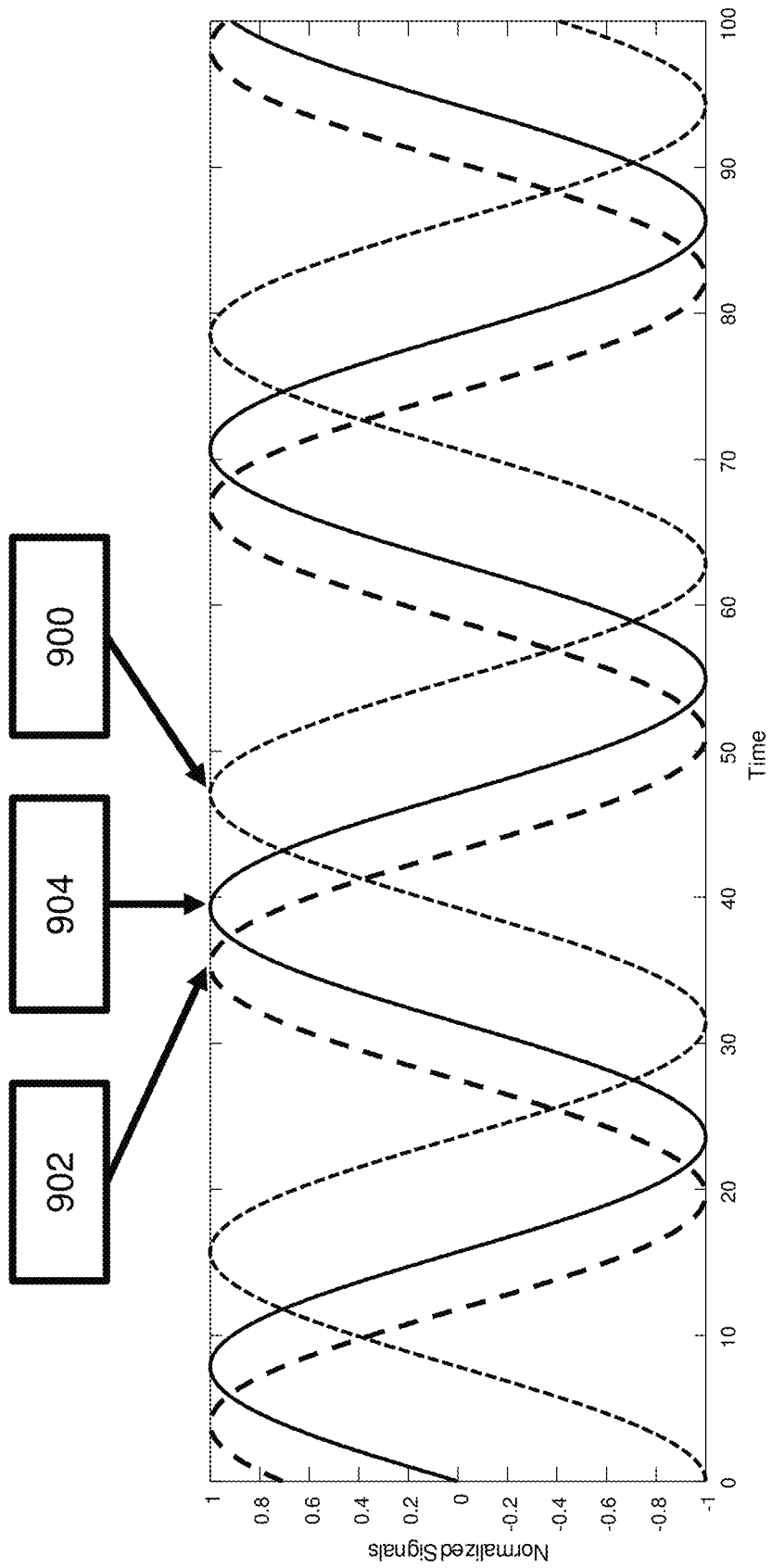
FIG. 9 is representation of a sensed RF voltage, a sensed RF current, and a reference signal.
Figure 10:
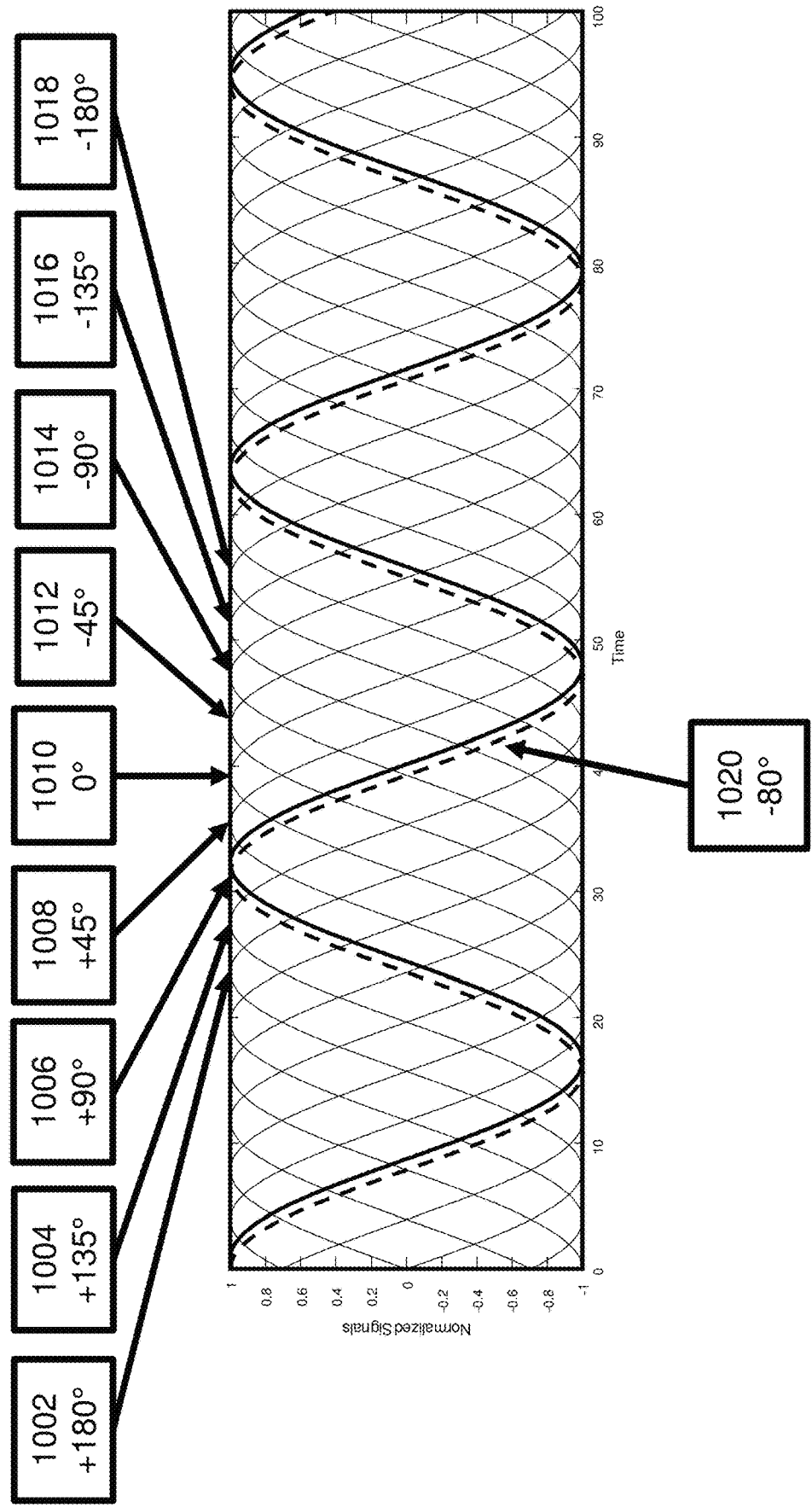
FIG. 10 is representation of a sensed RF signal and a plurality of generated reference signals have a phase from about −180° to about 180°.

Accordingly, in accordance with the present disclosure, under the control of the controller, the V/I probe transmits the sensed V and I information (e.g., RF signals) to a DSP or FPGA (e.g., the DSP or FPGA 506 of the circuitry 408). The DSP or FPGA are configured to determine a phase between the V and I, thus providing for a more accurate power calculation, and thus improved impedance tuning and/or impedance measurements at the matching network. For example, as shown graphically in FIG. 9, the voltage signal V shown as dotted line 900 and the current signal I shown as dashed line 902 are sensed by the respective inductor and capacitor configurations of the V/I probe, as described above. Next, in at least some embodiments, the V/I probe transmits the V and I signals to respective A/D converters for digitizing the V and I signals. Next, the A/D converters transmit the digitized V and I signals to the phase comparator. The phase comparator accesses one or more previously generated reference signals having a known phase angle, shown as solid line 904 (e.g., generated using the signal generator 405) that can be stored on a data look-up table in memory (e.g., the memory 404). In at least some embodiments, the generated reference signals, have a phase from about −180° to about 180°. The phases of the reference signals can be divided at certain increments, for example, 45°. In at least some embodiments and as shown in FIG. 10, such as when there are 9 generated reference signals, the phases of the reference signals 1002, 1004, 1006, 1008, 1010, 1012, 1014, 1016, 1018, can be divided as follows: 180°, 135°, 90°, 45°, 0, −45°, −90°, −135°, −180° respectively. The phase comparator is configured to detect a minimum phase gap using the generated phases for the reference signals. For example, in at least some embodiments, the phase comparator is configured to add each phase of the plurality of reference signals to the phase gap. For example, as shown in FIG. 10, if sensed V and I signals shown as dashed line 1020 have a phase gap of −80°, the phase comparator can determine a minimum phase gap by adding the phase gap −80° to each phase of the reference signals. For example, the reference signal with a 0 phase provides a phase 0+(−80°)=−80°. As shown in the table of FIG. 11, the phase comparator does this for each zone to determine the minimum phase gap. For example, reference signal 1002 having a known phase angle of 180° will have a phase gap of a measured signal 1020 having an actual phase angle of −80° will result in a phase gap between the reference signal 1002 and the measured signal 1020 of 100°, i.e., 180°+(−80°)=100°, 135°+(−80°)=55°, 90°+(−80°)=10°, 45°+(−80°)=−35°, −45°+(−80°) =−125°, −90°+(−80°)=−170°, −135°+(−80°)=−215°, −180°+(−80°)=−260°. In the current example, the minimum phase gap having the minimum magnitude i.e., the absolute value of the phase gap is 10°, e.g., the reference signal which produced the minimum phase gape is reference signal 1006 with the 90° phase angle, which produces a correction factor of −80°, which, in turn, allows the DSP or FPGA 506 to recover the accuracy of the phase measurements.

Next, at 804, under control of the controller, the matching network can be tuned using, for example, at least one of a peak or RMS of V, I and phase measured or calculated at the target frequency or under sweeping frequency. For example, in at least some embodiments, the stepping motors can be controlled to drive the variable capacitors or inductors to meet impedance tuning of matching networks of the processing chamber or process control of the processing chamber using values of a peak or RMS of V, I and phase measured or calculated at the target frequency or under sweeping frequency, into 50 ohms.

The V/I probe at the output of the matching network operates in the same manner, except instead of using the phase for impedance tuning of the matching network, the controller can use the phase (e.g., recovered phase information) for process control of the processing chamber.

Additionally, in some instances, there may be frequency error between an RF generator (e.g., RF signal generated by the RF plasma power supply 170 and/or a bias power supply 117) and the reference signals generated by the signal generator of the controller 400. Accordingly, in at least some embodiments, the controller is further configured to receive an excitor signal from an RF generator connected to the processing chamber and the controller, and can compensate for a frequency error of the RF signal detected by the first V/I probe or the second V/I probe at the target frequency using the excitor signal from the RF generator or the signal generator. In at least some embodiments, one or more field effect transistors can be used to amplify the excitor signal.

While the foregoing is directed to embodiments of the present disclosure, other and further embodiments of the disclosure may be devised without departing from the basic scope thereof.

The invention claimed is:

1. An apparatus configured to couple to a processing chamber for processing a substrate comprising:
    a first voltage/current (V/I) probe configured to connect to an input side or an output side of a matching network of the processing chamber comprising capacitors arranged in a voltage divider network configured to detect a voltage of an RF signal generated by an RF generator at a target RF frequency, and an inductor configured to detect a current of the RF signal generated by the RF generator at the target RF frequency;
    a processor coupled to the first V/I probe configured to determine a phase angle of the RF signal generated by the RF generator based on a voltage detected by the first voltage/current (VI) probe of the RF signal generated by the RF generator, and a current detected by the first voltage/current (VI) probe of the RF signal generated by the RF generator;
    the processor further configured to generate a plurality of offset RF reference signals at the target RF frequency of the RF generator, each of the offset RF reference signals having a known offset phase angle from −180° to +180° relative to the RF signal generated by the RF generator at the target RF frequency;
    the processor further configured to:
    i) determine a phase angle difference equal to a difference between the determined phase angle of the RF signal generated by the RF generator and the phase angle of each of the plurality of offset RF reference signals generated by the processor;
    ii) determine an absolute value of each phase angle difference;
    iii) determine the minimum absolute value of the plurality of phase angle differences;
    iv) determine a correction factor offset equal to the phase angle of the offset RF reference signal which produced the minimum absolute value phase angle difference out of the plurality of phase angle differences;
    v) determine a correction factor equal to a sum of the correction factor offset, and the phase angle difference between the offset RF reference signal which produced the minimum absolute value of the plurality of phase angle differences and the determined phase angle of the RF signal generated by the RF generator; and determining at a phase angle equal to the correction factor an impedance at output and controlling impedance tuning of the matching network based at least in part on at least one of the voltage of the RF signal generated by the RF generator and the current of the RF signal generated by the RF signal generator, detected by the first V/I probe.

2. The apparatus of claim 1, wherein the processor comprises at least one of a digital signal processor or a field-programmable gate array configured to filter the RF signal generated by the RF generator at the target frequency using at least one of a finite impulse response filter or an infinite impulse response filter.

3. The apparatus of claim 1, wherein the plurality of offset reference signals at the target RF frequency comprises nine or more offset RF reference signals evenly distributed at phase angels between −180° and +180°.

4. The apparatus of claim 1, wherein the plurality of offset RF reference signals at the target RF frequency were previously generated by a signal generator and stored in memory.

5. The apparatus of claim 1, wherein the first V/I probe is connected to the input side of the matching network, and further comprising a second voltage/current (V/I) probe configured to connect to an output side of a matching network of the processing chamber comprising capacitors arranged in a voltage divider network configured to detect a voltage of an RF signal generated by the RF generator at the target RF frequency, and an inductor configured to detect a current of the RF signal generated by the RF generator at the target RF frequency;

the processor coupled to the second V/I probe configured to determine a phase angle of the RF signal generated by the RF generator based on a voltage detected by the second voltage/current (VI) probe of the RF signal generated by the RF generator, and a current detected by the second voltage/current (VI) probe of the RF signal generated by the RF generator;

the processor further configured to:
i) determine a phase angle difference equal to a difference between the determined phase angle of the RF signal generated by the RF generator and the phase angle of each of the plurality of offset RF reference signals generated by the processor;
ii) determine an absolute value of each phase angle difference;
iii) determine the minimum absolute value of the plurality of phase angle differences;
iv) determine a correction factor offset equal to the phase angle of the offset RF reference signal which produced the minimum absolute value phase angle difference out of the plurality of phase angle differences;
v) determine a correction factor equal to a sum of the correction factor offset, and the phase angle difference between the offset RF reference signal which produced the minimum absolute value of the plurality of phase angle differences and the determined phase angle of the RF signal generated by the RF generator; and determining at a phase angle equal to the correction factor an impedance at output and controlling impedance tuning of the matching network based at least in part on at least one of the voltage of the RF signal generated by the RF generator and the current of the RF signal generated by the RF signal generator, detected by the second V/I probe.

6. The apparatus of claim 5, wherein the controller further includes an input RF signal from the RF generator connected to the processing chamber, and wherein the controller is configured to control the output of the matching network directed to the processing chamber based at least in part on the input RF signal from the RF generator connected to the processing chamber.

* * * * *